United States Patent
Helwig

(10) Patent No.: US 8,134,369 B2
(45) Date of Patent: Mar. 13, 2012

(54) METHOD OF TESTING ELECTRIC FIELD RECORDING OF A MARINE ELECTROMAGNETIC SENSOR CABLE

(75) Inventor: Stefan L. Helwig, Houston, TX (US)

(73) Assignee: KJT Enterprises, Inc., Houston, TX (US)

( * ) Notice: Subject to any disclaimer, the term of this patent is extended or adjusted under 35 U.S.C. 154(b) by 206 days.

(21) Appl. No.: 12/430,933

(22) Filed: Apr. 28, 2009

(65) Prior Publication Data

US 2010/0271032 A1     Oct. 28, 2010

(51) Int. Cl.
*G01V 3/00* (2006.01)
(52) U.S. Cl. .................. 324/365; 324/347; 324/357
(58) Field of Classification Search .............. None
See application file for complete search history.

(56) References Cited

U.S. PATENT DOCUMENTS

| | | | |
|---|---|---|---|
| 4,617,518 A * | 10/1986 | Srnka | 324/365 |
| 6,236,211 B1 | 5/2001 | Wynn | |
| 7,113,448 B2 | 9/2006 | Scott | |
| 7,411,399 B2 | 8/2008 | Reddig et al. | |
| 2007/0247161 A1* | 10/2007 | Zerilli et al. | 324/328 |
| 2008/0265895 A1* | 10/2008 | Strack et al. | 324/347 |
| 2010/0231224 A1* | 9/2010 | Lindqvist | 324/365 |

FOREIGN PATENT DOCUMENTS

GB     2442849 A     4/2008

OTHER PUBLICATIONS

Sinha, M.C. Patel, P.D., Unsworth, M.J., Owen, T.R.E., and MacCormack, M.G.R., 1990, An active source electromagnetic sounding system for marine use, Marine Geophysical Research, 12, 29-68.
Edwards, R.N., Law, L.K., Wolfgram, P.A., Nobes, D.C., Bone, M.N., Trigg, D.F., and DeLaurier, J.M., 1985, First results of the MOSES experiment: Sea sediment conductivity and thickness determination, Bute Inlet, British Columbia, by magnetometric offshore electrical sounding: Geophysics 50, No. 1, 153-160.
Edwards, R.N., 1997, On the resource evaluation of marine gas hydrate deposits using the sea-floor transient electric dipole-dipole method: Geophysics, 62, No. 1, 63-74.
Chave, A.D., Constable, S.C. and Edwards, R.N., 1991, Electrical exploration methods for the seafloor: Investigation in geophysics No. 3, Electromagnetic methods in applied geophysics, vol. 2, application, part B, 931-966.
Cheesman, S.J., Edwards, R.N., and Chave, A.D., 1987, On the theory of sea-floor conductivity mapping using transient electromagnetic systems: Geophysics, 52, No. 2, 204 217.
Strack, K.-M., 1992, Exploration with deep transient electromagnetics, Elsevier, 373 pp. (reprinted 1999).
Scholl, C. and Edwards, N., 2007, Marine downhole to seafloor dipole-dipole electromagnetic methods and the resolution of resistive targets, Geophysics, 72, WA39.
Notification of transmittal of the international search report and the written opinion of the international searching authority, or the declaration, International application No. PCT/US2010/029129, May 4, 2011.

* cited by examiner

*Primary Examiner* — Minh N Tang

(57) ABSTRACT

A method of testing the electric field recording of a marine electromagnetic sensor cable including electrodes is provided. The method includes causing current to flow between a pair of first electrodes disposed along the marine electromagnetic sensor cable. The flow of current generates a voltage that is impressed on a pair of second electrodes disposed along the marine electromagnetic sensor cable. A potential difference between the pair of second electrodes is measured. Accuracy of the electric field recording is inferred from the measured potential difference.

8 Claims, 4 Drawing Sheets

METHOD OF TESTING ELECTRIC FIELD RECORDING OF A MARINE ELECTROMAGNETIC SENSOR CABLE

FIELD

The invention relates generally to the field of marine electromagnetic geophysical surveying. More specifically, the invention relates to cables and related apparatus for acquiring, recording and transmitting electromagnetic signals produced for surveying Earth's subsurface.

BACKGROUND

Electromagnetic (EM) geophysical surveying includes "natural source" and "controlled source" EM surveying. Natural source EM surveying includes receiving electric and/or magnetic field signals at multi-component ocean bottom receiver stations, and by taking the ratio of perpendicular field components of the signals, one can eliminate the need to know the natural source. Hereto, marine natural source EM surveying has been restricted to autonomous recording stations.

Controlled source EM surveying includes imparting an electric field or a magnetic field into the Earth formations, those formations being below the sea floor in marine surveys, and measuring electric field amplitude and/or amplitude of magnetic fields by measuring voltage differences induced in electrodes, antennas and/or interrogating magnetometers disposed at the Earth's surface, or on or above the sea floor. The electric and/or magnetic fields are induced in response to the electric field and/or magnetic field imparted into the Earth's subsurface, and inferences about the spatial distribution of conductivity of the Earth's subsurface are made from recordings of the induced electric and/or magnetic fields.

Controlled source EM surveying known in the art includes imparting alternating electric current into formations below the sea floor. In frequency controlled source EM (f-CSEM) surveying, the alternating current has one or more selected frequencies. F-CSEM surveying techniques are described, for example, in Sinha, M. C. Patel, P. D., Unsworth, M. J., Owen, T. R. E., and MacCormack, M. G. R., 1990, *An active source electromagnetic sounding system for marine use*, Marine Geophysical Research, 12, 29-68. Other publications that describe the physics of and the interpretation of electromagnetic subsurface surveying include: Edwards, R. N., Law, L. K., Wolfgram, P. A., Nobes, D. C., Bone, M. N., Trigg, D. F., and DeLaurier, J. M., 1985, *First results of the MOSES experiment: Sea sediment conductivity and thickness determination, Bute Inlet, British Columbia, by magnetometric offshore electrical sounding*: Geophysics 50, No. 1, 153-160; Edwards, R. N., 1997, *On the resource evaluation of marine gas hydrate deposits using the sea-floor transient electric dipole-dipole method*: Geophysics, 62, No. 1, 63-74; Chave, A. D., Constable, S. C. and Edwards, R. N., 1991, *Electrical exploration methods for the seafloor*: Investigation in geophysics No 3, Electromagnetic methods in applied geophysics, vol. 2, application, part B, 931-966; and Cheesman, S. J., Edwards, R. N., and Chave, A. D., 1987, *On the theory of sea-floor conductivity mapping using transient electromagnetic systems*: Geophysics, 52, No. 2, 204-217.

In a typical f-CSEM marine survey, a recording vessel includes cables that connect to electrodes disposed near the sea floor. An electric power source on the vessel charges the electrodes such that a selected magnitude of alternating current, of selected frequency or frequencies, flows through the sea floor and into the Earth formations below the sea floor. At a selected distance ("offset") from the source electrodes, receiver electrodes are disposed on the sea floor and are coupled to a voltage measuring circuit, which may be disposed on the vessel or a different vessel. The voltages imparted into the receiver electrodes are then analyzed to infer the structure and electrical properties of the Earth formations in the subsurface.

Another technique for EM surveying of subsurface Earth formations known in the art is transient controlled source EM surveying (t-CSEM). In t-CSEM, electric current is imparted into the Earth at the Earth's surface (or sea floor), in a manner similar to f-CSEM. The electric current may be direct current (DC). At a selected time, the electric current is switched off, switched on, or has its polarity changed, and induced voltages and/or magnetic fields are measured, typically with respect to time over a selected time interval, at the Earth's surface or water surface. Alternative switching strategies are possible; as will be explained in more detail below. Structure of the subsurface is inferred by the time distribution of the induced voltages and/or magnetic fields. T-CSEM techniques are described, for example, in Strack, K.-M., 1992, *Exploration with deep transient electromagnetics*, Elsevier, 373 pp. (reprinted 1999).

Marine EM geophysical surveying typically involves deploying a plurality of multi-component acquisition apparatus on a water bottom. Each multi-component acquisition apparatus may include one or more sensors for receiving EM signals produced during surveying of the subsurface below the water bottom and electronics for recording the EM signals received at the sensor(s). Typically, before the multi-component acquisition apparatus are deployed, the electric field (E-field) recording of each multi-component acquisition apparatus is tested to ensure that the apparatus can record an E-field accurately. After the multi-component acquisition apparatus is deployed, it is also desirable to test the E-field recording of the apparatus again in order to ensure that the EM survey to be conducted using the apparatus would be reliable.

SUMMARY

In one aspect, the invention relates to a method of testing the electric field recording of a marine electromagnetic sensor cable including electrodes. The method comprises causing current to flow between a pair of first electrodes disposed along the marine electromagnetic sensor cable. The flow of current generates a voltage that is impressed on a pair of second electrodes disposed along the marine electromagnetic sensor cable. The method includes measuring a potential difference between the pair of second electrodes. The method includes inferring accuracy of the electric field recording from the measured potential difference.

Other features and advantages of the invention will be apparent from the following description and the appended claims.

BRIEF DESCRIPTION OF DRAWINGS

The accompanying drawings, described below, are not to be considered limiting of the scope of the invention, for the invention may admit to other equally effective embodiments. The figures are not necessarily to scale, and certain features and certain views of the figures may be shown exaggerated in scale or in schematic in the interest of clarity and conciseness.

DETAILED DESCRIPTION

Figure 1:
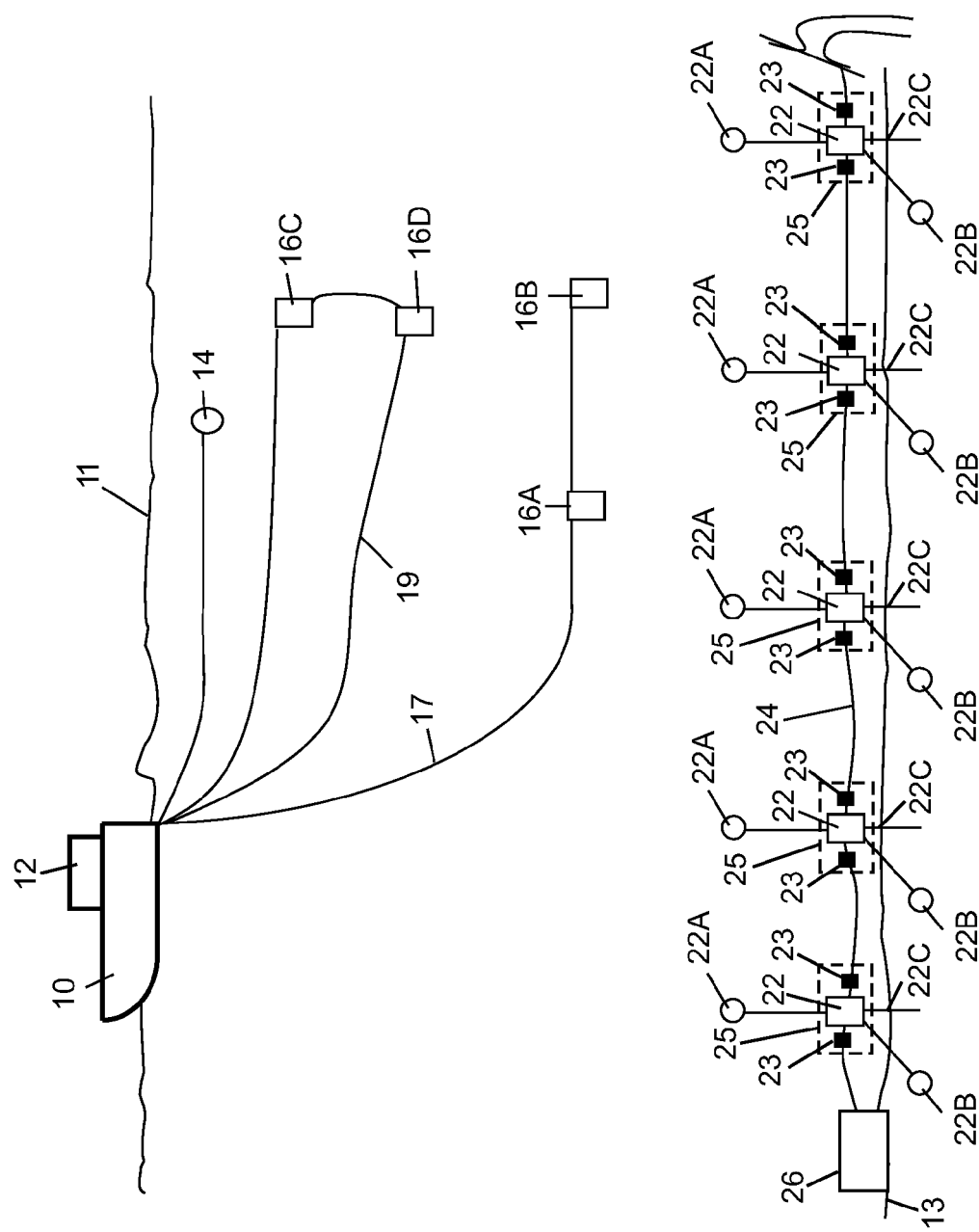
FIG. 1 depicts a marine electromagnetic survey system including a marine electromagnetic sensor cable.

The invention will now be described in detail with reference to a few embodiments, as illustrated in the accompanying drawings. In describing the few embodiments numerous specific details are set forth in order to provide a thorough understanding of the invention. However, it will be apparent to one skilled in the art that the invention may be practiced without some or all of these specific details. In other instances, well-known features and/or process steps may not be described in detail so as not to unnecessarily obscure the invention. In addition, like or identical reference numerals may be used to identify common or similar elements.

FIG. 1 shows a marine electromagnetic (EM) survey system including a survey vessel 10 that moves along the surface of a body of water 11 such as a lake or the ocean. The survey vessel 10 includes thereon certain equipment, shown generally at 12 and referred to for convenience as a "recording system." The recording system 12 may include (none of the following shown separately for clarity of the illustration) navigation devices, source actuation and control equipment, and devices for recording and processing measurements made by various sensors in the acquisition system. The vessel 10 may tow a seismic energy source 14 such as an air gun or an array of such air guns, a vertical electric dipole "source" antenna 19 including vertically spaced apart electrodes 16C, 16D and a horizontal electric dipole "source" antenna 17, which may include horizontally spaced apart electrodes 16A, 16B. The vertical electrodes 16C, 16D are typically energized by current flowing through one of the lines going from either electrode 16C or 16D to the survey vessel 10. The other line may be electrically inactive and only used to keep the vertical dipole antenna in is preferred shape. The electrodes on the source antennas 17, 19 may be referred to as "source electrodes" for convenience. The recording system 12 may include a controllable power supply (not shown separately) to energize the source electrodes for the purpose of inducing electromagnetic fields in the subsurface below the water bottom 13.

In the present example the source electrodes 16A, 16B and 16C, 16D, respectively on each antenna 17, 19, can be spaced apart about 50 meters, and can be energized by the power supply (not shown) such that about 1000 Amperes of current flows through the electrodes. This is an equivalent source moment to that generated in typical electromagnetic survey practice known in the art using a 100 meter long transmitter dipole, and using 500 Amperes current. In either case the source moment can be about $5 \times 10^4$ Ampere-meters. The source moment used in any particular implementation is not intended to limit the scope of this invention. The recording system 12 may include equipment (the source controller) that may actuate the seismic source 14 at selected times and may include devices that record or accept recordings for processing from seismic sensors that may be disposed in an electromagnetic (EM) sensor cable 24 or elsewhere in the system.

The EM sensor cable 24 is disposed on or near the water bottom 13 for making measurements corresponding to Earth formations below the water bottom 13. The EM sensor cable 24 may be used with natural source or controlled source EM surveys. The EM sensor cable 24 may include thereon a plurality of longitudinally spaced apart remote acquisition units (RAUs) 25. Each RAU 25 may include a sensor module 22. Each sensor module 22 may have inserted into an upper side thereof a substantially vertically extending sensor arm 22A. Preferably the vertically extending sensor arm 22A includes therein or thereon some type of buoyancy device or structure (not shown separately) to assist in keeping the sensor arm 22A in a substantially vertical orientation with respect to gravity. Each sensor module 22 may include extending from its lower side a spike 22C as described, for example, in Scholl, C. and Edwards, N., 2007, *Marine downhole to seafloor dipole-dipole electromagnetic methods and the resolution of resistive targets*, Geophysics, 72, WA39, for penetrating the sediments that exist on the water bottom 13 to a selected depth therein. In the present example, laterally extending sensing arms 22B may be disposed from one or both sides of each sensor module 22. Measurement electrodes 23, e.g., galvanic electrodes, may be disposed adjacent to the longitudinal ends of each sensor module 22. The measurement electrodes 23 may be used to measure voltages related to certain components of electric field response to induced electromagnetic fields in the Earth's subsurface.

Signals acquired by various sensing devices associated with each sensor module 22 and the EM sensor cable 24 may be transmitted to and stored in a recording node 26. Such transmission may be made by including in the EM sensor cable 24 one or more electrical and/or optical conductors (not shown) to carry electrical power and/or data signals. The recording node 26 may be disposed on the water bottom 13 as shown or disposed in a buoy (not shown) at the discretion of the system designer. The recording node 26 may include any form of data storage device, for example a terabyte-sized hard drive or solid state memory. If disposed on the water bottom 13 as shown in FIG. 1, the recording node 26 may be retrieved from the water bottom 13 by the vessel 10 to interrogate the storage device (not shown), or the storage device (not shown) may be accessed for interrogation by connecting a data transfer cable (not shown) to a suitable connector or port (not shown) on the recording node 26. The manner of data storage and transfer with respect to the node 26 may be according to well known art and are not intended to limit the scope of this invention.

Figure 2:
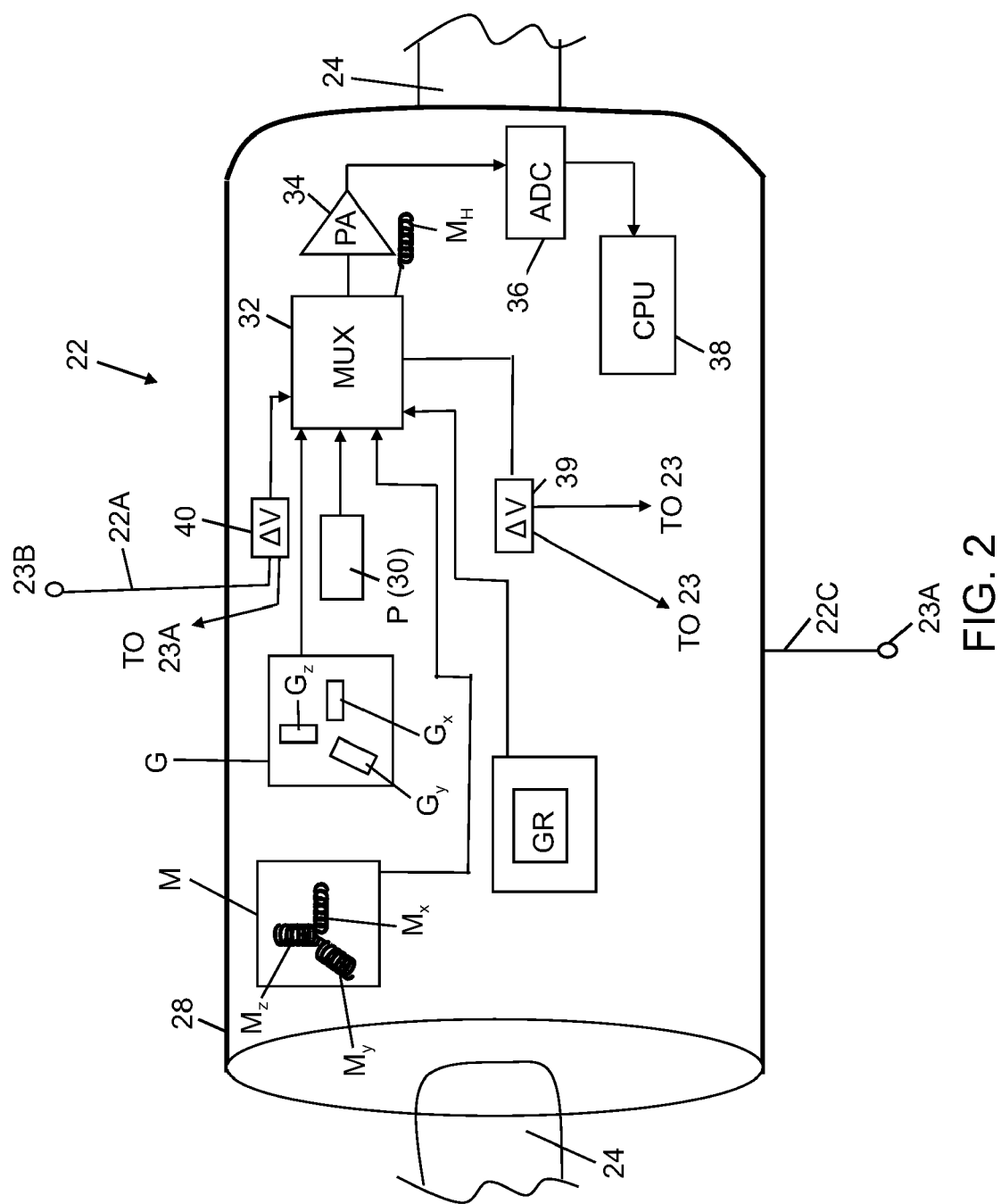
FIG. 2 is a cut-away view of a sensor module which may be disposed along the marine electromagnetic sensor cable of FIG. 1.

FIG. 2 is a cut-away view of one example of the sensor module 22 included in a RAU (25 in FIG. 1). The sensor module 22 may include a sealed, pressure resistant housing 28 affixed to the EM sensor cable 24 at a selected position along the EM sensor cable 24. The housing 28 may be affixed to the cable 24 by splicing within the cable, by molding the housing 28 thereon or by using water tight, pressure resistant electrical and mechanical connectors on each of the cable 24 and housing 28, such as a connector shown in U.S. Pat. No. 7,113,448 issued to Scott. The interior of the housing 28 may define a pressure sealed compartment that may include some or all of the components described below. Sensing elements in the module 22 may include a three-axis magnetometer M that includes horizontal Mx, My and vertical Mz component magnetic field sensors. A three component seismic particle motion sensor G may also be disposed in the housing 28. The seismic particle motion sensor G may include three mutually orthogonal motion sensors Gx, Gy, Gz such as geophones or accelerometers. The seismic sensor G detects particle motion components of a seismic wavefield induced by the seismic source (14 in FIG. 1). The sensor module 22 may also include a hydrophone 30 in pressure communication with the water (11 in FIG. 1) for detecting the pressure component of the seismic wavefield induced by the seismic source (14 in FIG. 1). The sensor module 22 may also include a gravity sensor GR within the housing 28. The sensor module 22 may include voltage measuring circuits 39, 40 to measure voltages impressed across pairs of measurement electrodes (23 in FIG. 1) disposed on opposed sides of the sensor module 22 along the cable 24. In the present example, the electrode pairs may also include an electrode disposed along or at the end of each of the vertical sensing arm 22A (the electrode shown at 23B) and the spike 22C (the electrode shown at 23A). The vertical sensing arm 22A may be coupled to the housing 28.

Signals generated by each of the sensing devices described above may enter a multiplexer 32. Output of the multiplexer 32 may be conducted through a preamplifier 34. The preamplifier may be coupled to the input of an analog to digital converter (ADC) 36, which converts the analog voltages from the preamplifier 34 into digital words for storing and processing by a central processor 38, which may be any microprocessor based controller and associated data buffering and/or storage device known in the art. Data represented by digital words may be formatted for signal telemetry along the cable 24 to the recording node (26 in FIG. 1) for later retrieval and processing, such as by or in the recording system (12 in FIG. 1). The sensor module 22 may also include one or more high frequency magnetometers MH in signal communication with the multiplexer 32 and the components coupled to the output thereof.

Figure 3:
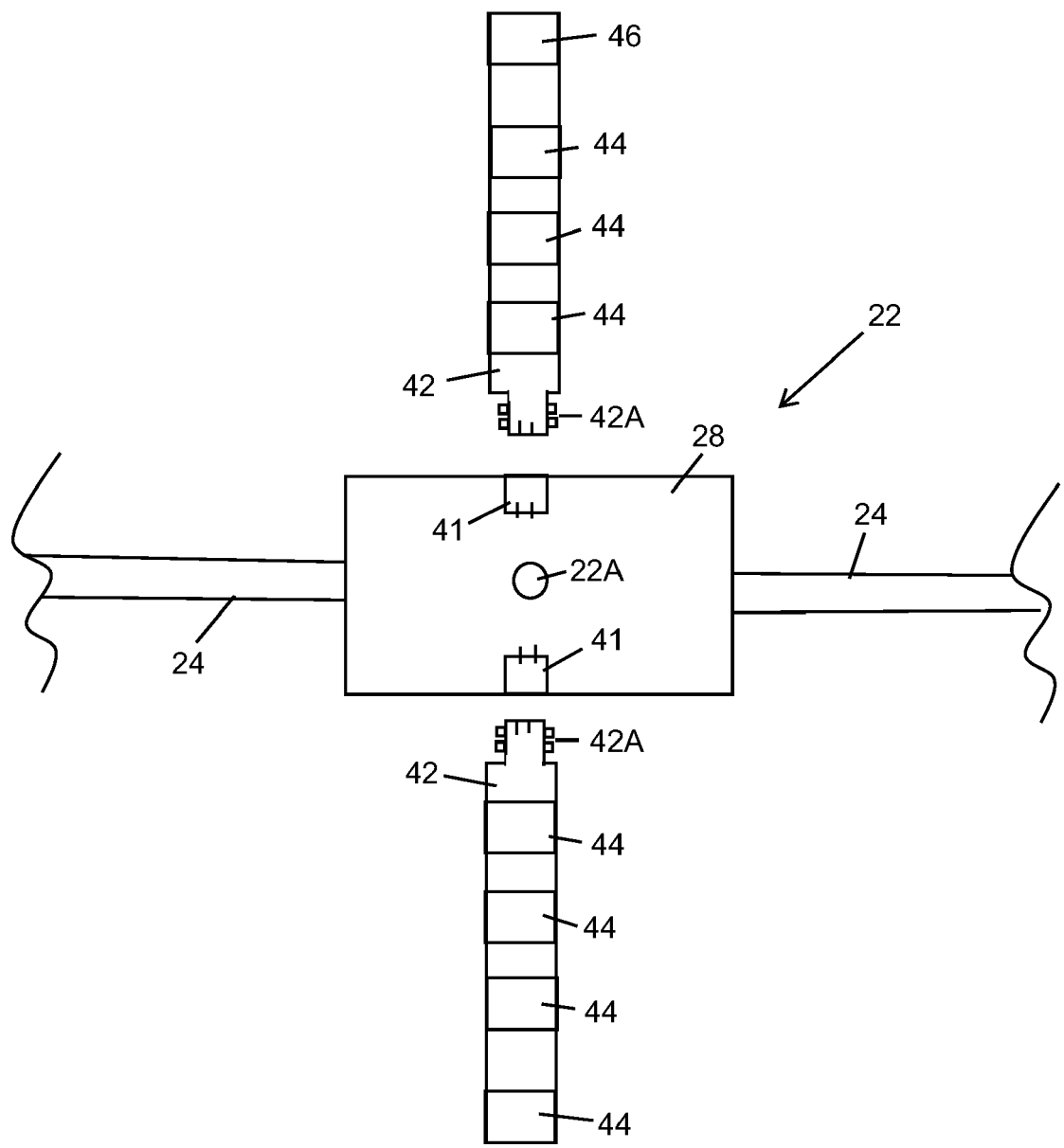
FIG. 3 is a plan view of the sensor module shown in FIG. 2.

The example sensor module 22 of FIG. 2 is shown in plan view in FIG. 3. The horizontal sensing arms 42 (also shown as 22B in FIG. 1) may be coupled to the housing 28 using pressure-sealed electrical connectors 42A that mate with corresponding connectors 41 in the housing 28. The sensing arms 42 may alternatively be permanently attached to the sensor module 22 and foldable as well. The connectors 42A, 41 include one or more insulated electrical contacts to communicate power and/or signals to various sensing elements in the horizontal sensor arms 42. The sensing elements may include a plurality of spaced apart single or multi-axis magnetic field sensors 44, and a galvanic electrode 46. The vertical sensing arm 22A may be similarly configured to have an electrode and multiple magnetic field sensors. The spike (22C in FIG. 2) may be similarly instrumented with such sensing devices. The various sensor arms and the spike may be configured such that they may be lockingly and quickly installed into the housing as shown as the cable 24 is extended into the water (11 in FIG. 1) from the survey vessel (10 in FIG. 1).

Configured as explained with reference to FIGS. 2 and 3, the sensor module 22 includes sensing devices to measure electric field in three dimensions, magnetic field in three dimensions and magnetic field gradient in at least two directions. Magnetic field gradient may be measured along the direction of the cable 24 (the third direction) by measuring difference between magnetic field measurements made in adjacent modules 22, or between successively more spaced apart modules 22 along the cable 24. By measuring spatial components of magnetic field gradient, it may be possible to determine components of electric field in a direction transverse to the magnetic field gradient measurements. Ampere's law states that the spatial gradient of the magnetic field is equivalent to the derivative in time of the dielectric displacement field D plus the free current density J, as shown in equation (1) below:

$$\nabla \times \vec{H} = \vec{J} + \frac{\partial \vec{D}}{\partial t} \quad (1)$$

The current density is linearly related to the electric field via the conductivity of the medium, the dielectric displacement field is linearly related to the electric field via the permittivity $\in$, and equation (1) can be formulated as:

$$\nabla \times \vec{H} = \sigma \vec{E} + \varepsilon \frac{\partial \vec{E}}{\partial t} \quad (1b)$$

As for the case of sea water the permittivity is 11 orders of magnitude smaller than the conductivity, so the second term on the left can be neglected.

The y-component of the electric field, Ey, can be calculated if the spatial changes of the z-component of the magnetic field, Hz, with respect to position along the cable, x, and the spatial change in magnetic field, Hx, with respect to vertical position, z, are known. Thus, by measuring magnetic field gradient along selected directions using a cable system as shown herein, it is possible to determine a transverse component of the electric field.

Figure 4:
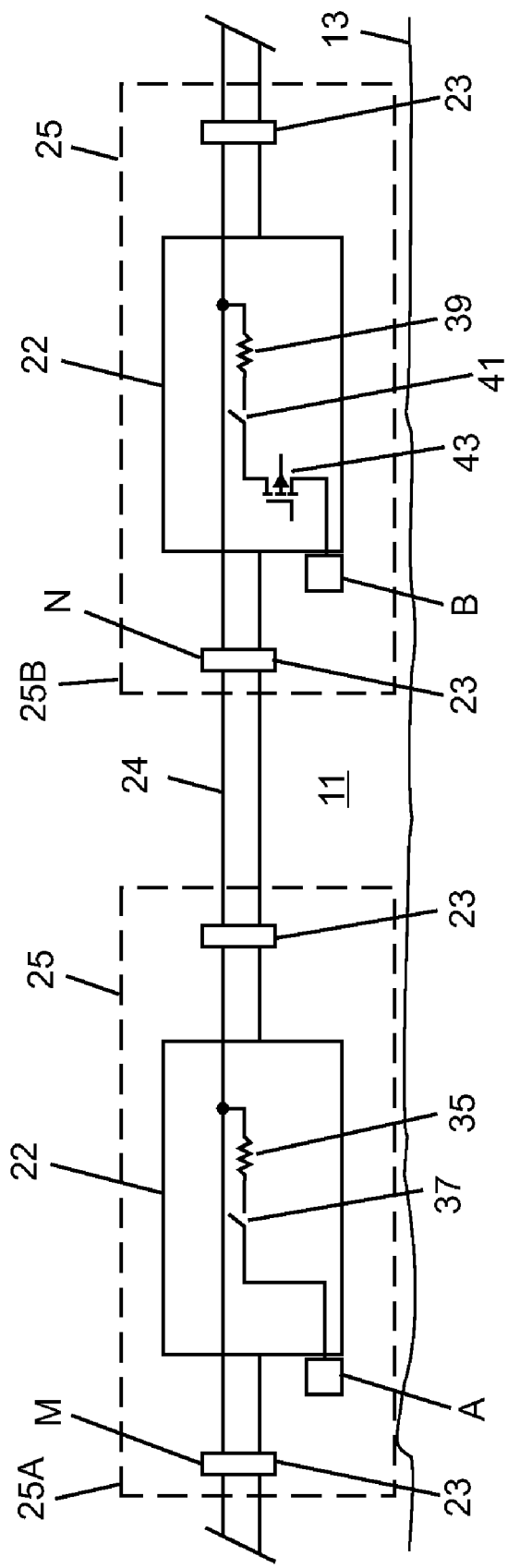
FIG. 4 illustrates testing of electric field recording of the marine electromagnetic sensor cable of FIG. 1.

FIG. 4 shows a portion of the EM sensor cable 24 with a pair of adjacent RAUs 25, which are identified separately by 25A and 25B. The RAUs 25A, 25B include measurement electrodes M and N (previously shown as 23 in FIG. 1), respectively. A circuit for testing the electric field recording of the RAUs 25A, 25B includes test electrodes A and B, which are disposed relative to the measurement electrodes M and N such that a current passed between the test electrodes A and B results in a potential difference between the measurement electrodes M and N that can be measured. The test electrodes A, B may be metallic or other galvanic electrodes. The test electrodes A, B may or may not be in close proximity to the measurement electrodes M, N, respectively. Preferably, the test electrodes A and B are in close proximity to the measurement electrodes M, N, respectively. In one example, close proximity is defined as being within 1 m, preferably within 0.75 m, more preferably within 0.5 m, of a respective one of the measurement electrodes M, N. The test electrodes A, B may be disposed adjacent to the sensor modules 22 in the RAUs 25A, 25B, respectively. The test electrodes A, B may be mounted on the exterior of the sensor modules 22. The test electrodes A, B are electrically connected via the portion of the EM sensor cable 24 between the RAUs 25A, 25B and the body of water 11 between the test electrodes A, B. Resistors 35 and 39 as well as switches 37 and 41 (e.g., relays) and transistor 43 are embedded in the connection between the test electrodes A, B and the EM sensor cable 24. RAU 25A may or may not have a transistor in between electrode A and switch 37.

When power is supplied to the EM sensor cable 24, the resistivity of the EM sensor cable 24 and the power consumption of the RAUs 25 cause a voltage drop along the cable. During the test cycle, switches 37, 41 are closed and the transistor 43 is operated to modulate current flow between the test electrodes A and B. The transistor 43 may be controlled by a processor in the RAU 25B (e.g., CPU 38 in FIG. 2). The voltage drop ($U_L$) along the length of EM sensor cable 24, between the RAUs 25A, 25B, causes current to flow from the test electrode A to the test electrode B through the body of water 11. According to Kirchoff's rule, the current flowing through the body of water 11, from the test electrode A to the test electrode B, is:

$$I_2 = \frac{IR_L}{2R_1 + R_w + R_L} \quad (2)$$

where $R_1$ is the resistance of the resistors 35, 39; $R_L$ is the resistance of the cable between the RAUs 25A, 25B causing the voltage drop $U_L$; and $R_w$ is the resistance in the body of water 11. Typically, $U_L$ is on the order of 1.5 V. The current flowing from the test electrode A to the test electrode B generates a voltage ($U_w$) in the body of water 11 that is impressed on the measurement electrodes M, N. The transistor 43 may be used to modulate the voltage ($U_w$) seen by the measurement electrodes M, N, as explained above.

For low frequency measurements, the relationship between the voltage ($U_w$) impressed on the measurement electrodes M, N and the current flowing from the test electrode A to test electrode B can be described in full space as:

$$R_w = \frac{U_w}{I_2} = \frac{\rho}{4\pi} \cdot \left( \frac{1}{AM} - \frac{1}{AN} - \frac{1}{BM} + \frac{1}{BN} \right) \quad (3)$$

where $R_w$ is the resistance of the water; $U_w$ is the voltage seen by the measurement electrodes M, N; 12 is current through the water; $\rho$ is water resistivity; AM is the distance between the electrodes A, M; AN is the distance between the electrodes A, N; BM is the distance between the electrodes B, M; and BN is the distance between the electrodes B, N. For illustration purposes, if $\rho$=0.3 Ω-m, AM=BN=0.25 m, AN=49.75 m, and BM=50.25 m, then $R_w$ is 0.190. The current flowing from the test electrode A to B will result in a voltage, $U_w=I_2 \times R_w$, between the test electrodes A, B. From equation (2), for I=1A, $U_L$=1.5 V, and $R_1$=240Ω, the voltage, $U_w$, between the test electrodes A, B will be 140 µV. With an amplification of 10,000, the measured voltage would be 1.4V.

During the test cycle, the measurement electrodes M, N will see a voltage signal of known frequency. The voltage signal seen by the measurement electrodes M, N can be measured by voltage measuring circuits (not shown separately) in the sensor modules 22 associated with the RAUs 25A, 25B. The outputs of the voltage measuring circuits may be sent to the surface using standard cable telemetry. The outputs of the voltage measuring circuits are used to determine the potential difference between the measurement electrodes M, N. From the potential difference, the current flowing from the test electrode A to the test electrode B, as seen by the measurement electrodes M, N, can be calculated. If the calculated current is representative of the actual current flowing from the test electrode A to the test electrode B, then the electric field recording of the RAUs 25A, 25B can be considered to be functioning properly. A series of potential difference measurements can be made while modulating the current flowing from the test electrode A to the test electrode B to ascertain that the electric field recording of the RAUs 25A, 25B is functioning properly.

The test described above can be conducted for additional pairs of RAUs 25 along the length of the EM sensor cable 24 to ascertain that the electric field recordings of all the RAUs along the EM sensor cable 24 are functioning properly. Each additional pairs of RAUs would include a testing circuit as described above. If for any tested pair of RAUs 25 the current calculated from measured potential difference is not representative of the actual current transmitted between the test electrodes A and B of the RAUs, the RAUs in question can be isolated for further testing and/or repair. It should be noted that the actual amplitude of the voltage signal seen by the measurement electrodes M, N will depend slightly on the conductivity of the environment and may be used to gather information on the conductivity of the immediate surroundings of the measurement electrodes, i.e., near surface effects.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of testing electric field recording in a body of water, the method comprising:
    (a) arranging a marine electromagnetic sensor cable having a plurality of measurement electrodes disposed thereon in the body of water;
    (b) forming a first conductive path including a volume of the body of water between a pair of test electrodes;
    (c) forming a second conductive path including at least one resistor between a segment of the marine electromagnetic sensor cable and the pair of test electrodes;
    (d) generating a voltage drop along the segment of the marine electromagnetic sensor cable that causes current to flow between the pair of test electrodes along the first conductive path;
    (e) measuring a potential difference between a selected pair of the measurement electrodes, the selected pair of the measurement electrodes being disposed relative to the pair of test electrodes such that the measured potential difference is responsive to the flow of current along the first conductive path; and
    (f) determining an electric field recording of the selected pair of the measurement electrodes in the body of water from the measured potential difference.

2. The method of claim 1, wherein measuring the potential difference between the selected pair of measurement electrodes comprises measuring voltage signals at the selected pair of measurement electrodes.

3. The method of claim 2, further comprising:
    (g) modulating the current flowing between the pair of test electrodes along the first conductive path during at least a portion of step (e).

4. The method of claim 3, wherein the second conductive path comprises a transistor, and wherein step (g) comprises using the transistor to modulate the current.

5. The method of claim 1, wherein in step (e), each of said pair of test electrodes is within 1 m of said selected pair of measurement electrodes.

6. The method of claim 1, wherein the second conductive path comprises a pair of switches, and wherein step (d) comprises closing the switches to allow current to flow along the first conductive path.

7. The method of claim 1, wherein the second conductive path comprises a pair of resistors.

8. The method of claim 1, further comprising repeating steps (b) through (f) for another pair of test electrodes, another pair of measurement electrodes, and another segment of the marine electromagnetic sensor cable.

* * * * *